Dec. 31, 1929.    C. S. BRAGG ET AL    1,741,819
BRAKE MECHANISM FOR AUTOMOTIVE VEHICLES
Original Filed May 13, 1927    2 Sheets-Sheet 1
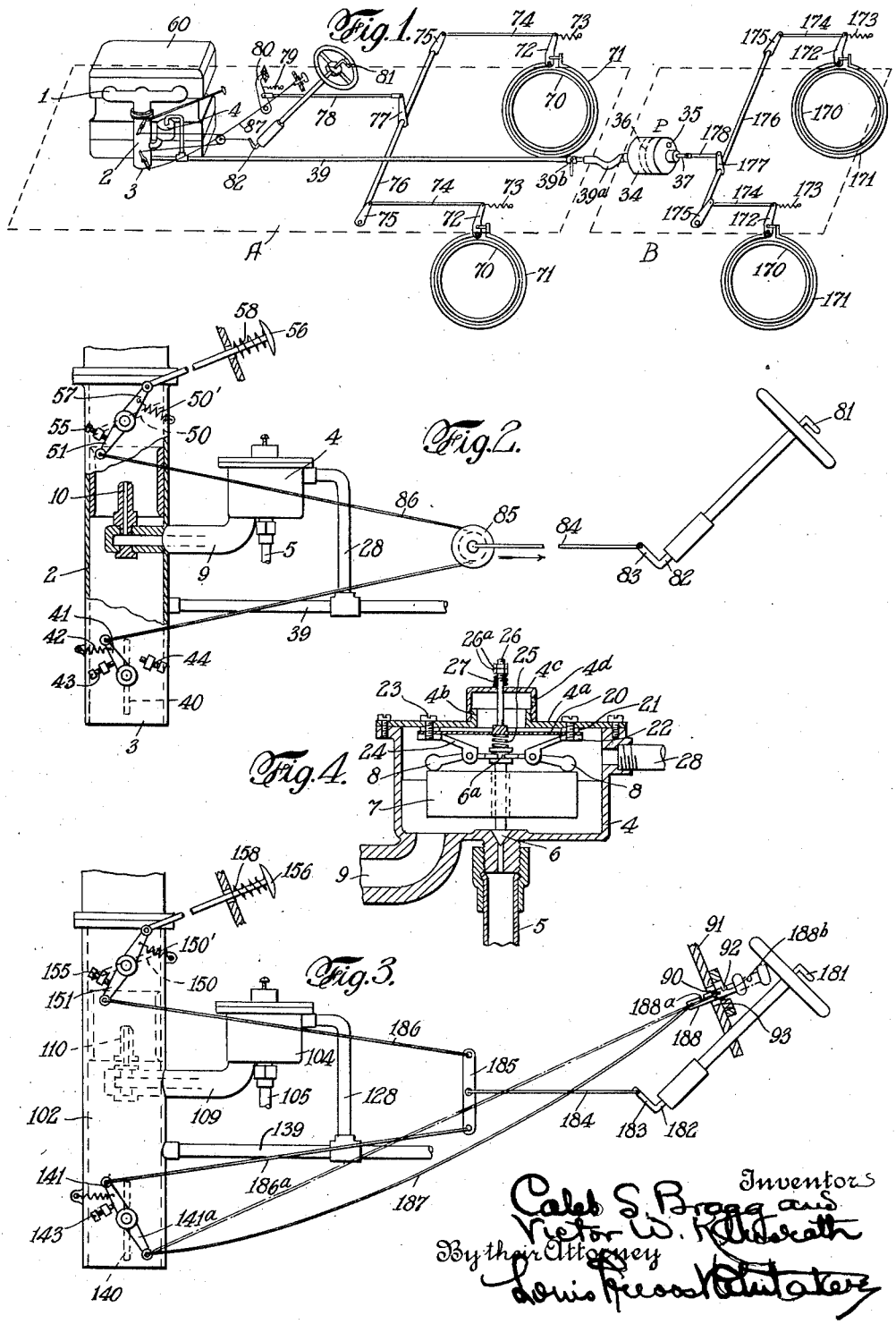

Dec. 31, 1929. C. S. BRAGG ET AL 1,741,819
BRAKE MECHANISM FOR AUTOMOTIVE VEHICLES
Original Filed May 13, 1927  2 Sheets-Sheet 2

Patented Dec. 31, 1929

1,741,819

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed May 13, 1927, Serial No. 190,989. Renewed September 30, 1929.

Our invention consists in the novel features hereinafter described, reference being had to the accompanying drawing which illustrates several embodiments of the invention selected by us for purposes of illustration, and the said invention is fully disclosed in the following description and claims.

Our invention relates to power actuated brake mechanism for automotive vehicles propelled by an internal combustion engine, in which a power actuator comprising a cylinder and a piston therein connected with brake mechanism, has the actuator cylinder connected with the suction passage of the engine between the air inlet for said suction passage and the carburetor jet nozzle for fuelizing the air passing to the engine cylinders to form the normal explosive charges therefor, and in which the actuator is operated to apply the brake mechanism by shutting off to a greater or less extent the admission of atmospheric air to the suction passage of the engine, as by means of a brake applying valve for controlling said air inlet aperture, and in which the carburetor is provided with a float chamber in which a constant level of liquid fuel is normally maintained substantially at or very slightly below the level of the discharge orifice of the jet nozzle within the suction passage. The suction passage of an internal combustion engine is usually provided with a Venturi tube, or a slightly restricted portion, surrounding the jet nozzle so that there is a slight degree of rarefication in the suction passage of the engine above the liquid fuel level in the nozzle, and the liquid in the float chamber is ordinarily subjected to normal atmospheric pressure, so that the liquid fuel is supplied under slight pressure to the air passing through the suction passage, in the normal operation of the engine in accordance with the quantity of air passing through under the control of the throttle valve. Where a brake applying valve, which closes more or less the air inlet for the suction passage for the purpose of operating a suction power actuator, the closing of such brake valve creates an abnormal degree of rarefication in the air inlet portion of the suction passage, while at the same time diminishing the quantity of air passing therethrough, and without suitable means for meeting this condition the operation of the power actuator to apply the brakes will have the effect of creating such a differential of pressures between the jet nozzle and the liquid in the float chamber, as to discharge an excess quantity of liquid fuel into the suction passage, producing too rich a mixture and stalling the engine.

Our present invention has for its object the provision of means for substantially equalizing the pressures upon the surface of the liquid in the float chamber and at the discharge orifice of the nozzle at all times, so that when the brake applying valve is moved in a direction to close the air inlet to the suction passage of the engine, the carburetor will act to fuelize the smaller quantity of air passing through said passage without discharging excess quantities of fuel thereinto, by creating above the liquid in the float chamber a degree of rarefication substantially equal to that within the suction passage below the jet nozzle of the carburetor, and permitting the carburetor to operate in the usual manner at all times regardless of variations in the degree of rarefication in the suction passage of the engine. We accomplish this result by connecting the float chamber of the carburetor above the liquid level therein, by a continuously open equalizing passage with the portion of the suction passage of the engine between the brake applying valve controlling the air inlet to the suction passage (or to the suction pipe extending therefrom to the cylinder of the suction actuated device). Our invention also comprises a means for compensating for the sub-atmospheric pressures to which the float chamber of the carburetor is subjected during applications of the brakes, to prevent an abnormal rise of the liquid level in the float chamber, and also comprises means for automatically effecting the opening of the throttle valve after the brake applying valve has been moved to its closed position, when desired, to expedite the exhaustion of air from the actuator cylinder, and auxiliary means for locking the brake applying valve to prevent its operation in case the actuator is disconnected from the suction passage and for releasing said valve to permit it to be operated as a choke valve in starting the engine, when desired.

In the accompanying drawing,

Fig. 1 represents a diagrammatic view illustrating an embodiment of our invention in connection with a tractor and trailer, the tractor brake mechanism being operated in this instance by a foot lever, and the trailer brake mechanism being actuated by a power actuator located on the trailer and connected by a suction pipe with the suction passage of the engine.

Fig. 2 illustrates a slight modification showing an enlarged detail view of the suction passage of the engine, the carburetor, the throttle valve and brake applying valve, and connected parts.

Fig. 3 is a view similar to Fig. 2 showing a further slight modification.

Fig. 4 is an enlarged sectional view of the carburetor float chamber.

Figure 5:
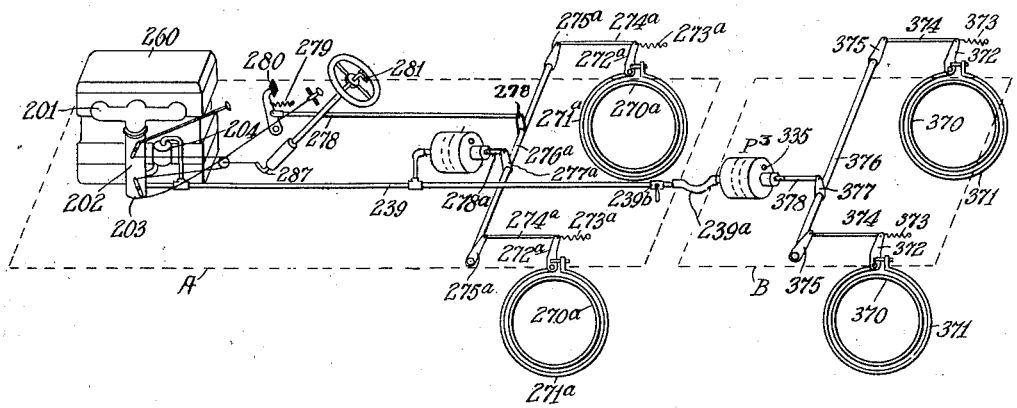
Fig. 5 is a diagrammatic view similar to Fig. 1 showing a slightly modified form.

In Fig. 1 of the drawing, we have shown diagrammatically an installation in connection with a motor operated vehicle hereinafter called the tractor, and a trailer operatively connected therewith and propelled by the tractor. In this figure the tractor vehicle is indicated at A in dotted lines, and is provided with the internal combustion engine indicated at 60, for propelling it, and with suitable brake mechanism which may be of any usual or preferred type, and which is operated in this instance by the usual foot lever indicated at 80. In this instance two brake mechanisms are shown diagrammatically, as for the rear wheels of the tractor vehicle, and each comprises the brake drum, 70, brake band, 71, brake applying lever, 72, and retracting spring, 73. In this instance the brake levers, 72, are each connected by a rod, 74, with an arm, 75, on a rock shaft, 76, provided with an arm, 77, connected by a link rod, 78, with the foot lever, 80, which is provided with the usual retracting spring, 79, but it is to be understood that any other form of brake mechanism may be provided for the tractor vehicle. The trailer is indicated at B in dotted lines, and is provided with suitable brake mechanism here shown in the same manner as that previously described, the parts being given the same reference numerals with the addition of 100 to avoid repetition. The brake levers, 172, of the tractor brake mechanism are connected in this instance by the links, 174, with arms, 175, of a cross shaft, 176, having an arm, 177, connected by link, 178, with the piston rod, 37, of a power actuator indicated as a whole at P, mounted on the tractor and comprising a cylinder, 34, open to the atmosphere at its inner end as indicated at 35, and provided with a piston, 36, the forward end of the cylinder, 34, being connected by a suction pipe, 39, with the suction passage of the engine.

In this instance the engine, 60, is shown as provided with the usual intake manifold indicated at 1, provided with the vertically disposed suction passage indicated at 2, having an air inlet, 3, at its lower end for admitting the air for the normal mixture supplied to the engine cylinders. The suction passage is shown provided with the usual throttle valve indicated at 50, normally held in idling position, that is to say, substantially closed position, but permitting the passage of sufficient mixture to keep the engine idling, the closed or idling position of the throttle valve being determined by an adjustable stop indicated at 55, engaging in this instance an operating arm, 51, connected with the shaft of the throttle valve. The throttle valve will be provided with any usual means for enabling it to be opened to the desired extent by the operator of the tractor vehicle. In this instance we have indicated a foot operated accelerator or mushroom plug at 56, connected with an arm, 57, secured to the throttle valve, to which the retracting spring, $50^1$, is in this instance secured, and an accelerator may also be provided with a retracting spring indicated at 58, if desired.

The lower end of the suction passage, 2, is also provided with a brake applying valve indicated at 40, for closing the air inlet, 3, said valve being provided with an operating arm, 41, and also being provided with a retracting spring indicated at 42, in this instance connected with said arm for holding the valve, 40, in wide open position in which it is arrested by an adjustable stop, indicated at 43, for engaging the arm, 41. An adjustable stop, 44, is also provided for engaging the arm, 41, to arrest the valve, 40, in its closed position, so as to prevent it from being entirely closed, and providing in the closed position of the valve for the admission of a sufficient quantity of air to insure the operation of the engine, and to prevent the stalling of the engine. The spring, 42, is preferably weaker than the spring, $50^1$, for retracting the throttle valve, for a reason which will be hereinafter explained.

As clearly shown in Fig. 2, the suction pipe, 39, from the power actuator cylinder is connected to the suction passage between the brake applying valve or air inlet valve, 40, and the jet nozzle of the carburetor, which is indicated at 10, and is connected by a pipe, 9, with the carburetor float chamber, indicated at 4, and provided with a liquid fuel supply pipe, 5, which supplies fuel from a reservoir, not shown, at approximately a constant pressure in any of the conventional ways. We prefer a form of carburetor float chamber, as indicated in Figure 4, in which the needle valve, 6, which controls the fuel supply to the float chamber, is movable vertically through the float, 7, in the usual manner, the needle valve stem being provided at its upper end with the usual grooved portion indicated at 6ª. The float chamber is provided with a closed top, 4ª, having a central aperture surrounded by a threaded flange, 4ᵇ, upon which is secured a cap, 4ᶜ, having a vent aperture, 4ᵈ, therein, communicating with the atmosphere. The lower side of the cover, 4ª, is provided with a flexible diaphragm indicated at 20, extending across the central aperture in the cover and closing said aperture, being preferably spaced from the cover as by an annular ring or washer, 21, said diaphragm being secured in position by a clamping ring indicated at 22, secured to the cover by screws, 23. The ring, 22, is provided with brackets, 24, to which are pivoted the usual float engaging levers, 8, having their weighted ends resting upon the float, 7, and provided with yokes engaging the grooved portion, 6ª, of the needle valve. We also provide a spring, 25, interposed between the upper end of the needle valve and the diaphragm, 20, the normal tension of which aids the balanced weights to close the needle valve. The maximum tension of this spring may be adjusted by means of a threaded stem, 26, extending through the cap, 4ᶜ, and attached to the diaphragm, said screw being provided with set nuts, 26ª, and a spring 27, interposed between the lower nut and the top of the cap, 4ᶜ, to provide for a delicate adjustment of the parts, the object of which is to adjustably limit the downward movement of the diaphragm in order to regulate the level of the liquid fuel in the float chamber during the times that the brakes are applied.

The float chamber, 4, of the carburetor is connected above the liquid level therein by an equalizing pipe or passage indicated at 28, with the lower portion of the suction passage, 2, at a point between the jet nozzle of the carburetor and the Venturi tube surrounding the same, and the brake valve, or what amounts to the same thing, is connected as herein shown to the suction pipe, 39, which as previously stated is connected to the suction passage at such point.

In the ordinary operation of the engine, it will be understood that the condition as regards pressure (the brake applying valve, 40, being open) within the lower suction passage, 2, below the carburetor jet as well as within the suction pipe, 39, will be substantially atmospheric pressure which will be transmitted to the surface of the liquid in the carburetor float chamber, 4, so that the carburetor will operate exactly in the usual or normal manner. When, however, the brake valve, 40, is closed to a greater or less extent, a degree of rarefication is produced in the lower portion of the suction passage, 2, and in the suction pipe, 39, resulting in the exhaustion of the air from the actuator cylinder, 34, and application of the brakes. This degree of rarefication will be immediately communicated to the float chamber of the carburetor above the liquid level therein, thereby maintaining the equalization of pressures within the suction passage below the jet nozzle and above the liquid in the float chamber, and permitting the Venturi passage which produces a slightly greater degree of rarefication around the nozzle, 10, than exists below the Venturi tube, to insure the operation of the carburetor in fuelizing the air passing through the suction passage, 2, under such conditions in exactly the same manner that it does in its normal operation. At the same time any material reduction of pressure below atmospheric in the float chamber of the carburetor will normally reduce the downward pressure on the top of the float, which will have the same effect as an increase of the pressure in the fuel supply pipe, 5, and it will, therefore, require greater pressure to close the fuel inlet needle valve. If this tendency is not compensated, there would be a correspondingly greater submersion of the float and a slight rise of the liquid level in the float chamber, which would cause an increased discharge of liquid from the jet nozzle of the carburetor. When, however, rarefication in the space above the liquid in the float chamber takes place, there will be a corresponding deflection downwardly of the diaphragm, 20, compressing the spring, 25, and increasing the pressure upon the needle valve to an extent to compensate for the increased liquid pressure thereon, so that no appreciable rise of the liquid level in the float chamber is permitted, and the uniform operation of the carburetor at all times is thus secured.

We also prefer to provide means for operating the brake applying valve, 40, so constructed as to first operate said brake applying valve to move it toward and to its normal closed position determined by the adjustable stop, 44, and as soon as the valve, 40, is closed to automatically open the throttle valve to facilitate the withdrawal of air from the cylinder, 34, of the power actuator, when desired.

In Figs. 1 and 2, we have illustrated one means of accomplishing this result. In this instance, 81 represents a hand lever or operator operated part which is connected with a vertical shaft, 82, extending through the steering post and provided with a crank arm, 83, connected by a link or cable, 84, with a pulley, 85, and a cable or other flexible connection, 86, has its end portions connected respectively with the arm, 41, of the brake applying valve and the arm, 51, of the throttle valve, and an intermediate portion passing around the pulley, 85. As before stated, the retracting spring, 42, for the brake applying valve, 40, is weaker than the retracting spring, 50¹, for the throttle valve, and it therefore, follows when the arm, 83, is moved in a direction to exert a pull on the pulley, 85, in the direction of the arrow Fig. 2, the movement will be transmitted first to the brake applying valve, 40, moving it toward or to closed position, shutting off the air inlet, 3, to a greater or less extent, exhausting air from the power actuator cylinder, 34, and applying the brakes connected with the piston thereof, in this instance the trailer brakes, to a greater or less extent. If a very rapid action of the brake mechanism controlled by the actuator is desired, a greater movement of the arm, 83, will first effect the closing of the brake applying valve, 40, after which the movement of the arm, 83, will be applied by the pulley, 85, to the portion of the cable, 86, extending to the arm, 51, of the throttle valve, and the throttle valve will be opened to a greater or less extent, thus hastening the exhaustion of air from the actuator cylinder and expediting the application of the brake mechanism connected with its piston.

In Fig. 3, we have shown a construction similar to that illustrated in Fig. 2, and the corresponding parts have been given the same reference numerals as in Fig. 2 with the addition of 100 to avoid repetition. In this figure, however, the crank arm, 183, connected with the operator operated part, 181, is connected by a link rod, 184, with an equalizing bar, 185, intermediate its ends instead of being connected to a pulley, as in Fig. 2, and the ends of the equalizing bar are connected by rods, 186 and 186ª respectively, with the throttle valve actuating lever, 151, and the brake valve actuating lever, 141, the operation being exactly the same as that previously described so far as these parts are concerned.

In this figure we have also shown means for temporarily locking the brake valve, 140, or air inlet valve, in its normal or open position, in which case the operation of the part, 181, will effect the operation of the throttle lever only, and in the same manner as the ordinary hand throttle of an ordinary automobile. In this instance we have shown the brake valve, 140, provided with a second arm, 141ª, which is connected in this instance by a slack wire or cable, 187, with a pull-out plug, 188, which may be locked in either one of two positions by any suitable means. In the present instance I have shown the stem of the pull-out plug engaging a slot, 90, in the instrument board, 91, the instrument board being provided with a locking detent, 92, for engaging notches, 188ª and 188ᵇ, in the pull-out plug, which is held in engagement with the detent by a spring, 93, on the instrument board engaging its under side. This construction, however, is merely illustrative. By depressing the pull-out plug and drawing it out into the position shown in dotted lines in Fig. 3, so as to lock it with the detent, 92, in engagement with the notch or recess, 188ª, for example, the slack connection, 187, will be drawn taut, as shown in dotted lines in Fig. 3, thus holding the arm, 141, in engagement with the stop, 143, and maintaining the brake actuating valve, 140 in fully open position. Under these circumstances any movement of the operator operated part, 181, will be transmitted only to the throttle valve through the equalizing bar, 185, the lower end of which will be held for movement. For example, in an installation such as is illustrated in the diagram, Fig. 1, in which the power actuator is located on the trailer, B. and connected with the brake mechanism thereof, it may be desirable at times to use the tractor without the trailer, and in such case the flexible portion, 39ª, of the suction pipe, 39, which extends between the two vehicles will be disconnected. In such case it is desirable to lock the valve, 140, as above described, in order to prevent it from being carelessly closed by the operator and the engine thereby throttled down. It may be even under such circumstances desirable at times to close the valve, 140, as in using it as a choke valve in starting the engine, and if this is desired it is only necessary to release the plug, 188, and push it in to its innermost position, relieving the slack connection, 187, when the valve, 140, can be closed by the operator operated part, 181, with or without opening the throttle valve to choke the suction passage of the engine (102 in Fig. 3), and starting the engine, after which the plug, 188, can be pulled out and locked in its outermost position. It will be understood that when the actuator cylinder is connected with the suction pipe, 139, the plug, 188, will normally be in the innermost position shown in full lines in Fig. 3, and the connection, 187, will be relieved. The suction pipe, 39, may be provided with a cock, 39ᵇ, at the rear end of the tractor vehicle, if desired, as shown in Fig. 1, which can be closed when the trailer is disconnected, but this is unnecessary as the result of leaving this pipe open would be merely to allow portions of the atmospheric air for the explosive mixture to be drawn into the suction passage through the pipe, 39, while other portions enter through the inlet adjacent to the brake operating valve, and this would not effect the normal operation of the engine, as the pipe, 39, is connected to the suction passage below the carburetor jet nozzle.

While we have shown in Fig. 1 an installation in which brake mechanism for the main vehicle or tractor is operated by a foot pedal and through the physical force of the operator alone, it is perfectly obvious that a power actuator might be located upon the main vehicle and the piston thereof connected to the rock shaft in the same manner as the piston of the actuator P in Fig. 1 is connected to the rock shaft 176 on the trailer, so that the brake mechanism of the main vehicle might be operated by power. For instance, we have shown in Fig. 5 an example of such an arrangement wherein the power actuator P² is connected to the suction pipe 239 and has the piston thereof coupled to a lever 277ª on the rock shaft 276ª by means of a link or rod 278ª. The rock shaft is provided at opposite ends with levers 275ª which are in turn connected to levers 272ª through links 274ª. The levers 272ª are connected in the usual manner to the brake bands 271ª which surround brake drums 270ª on the drive wheels of the vehicle. In this instance it is noted that the foot pedal 280 is connected through the link 278 with the rock shaft 276ª so that the tractor brakes can be applied through the physical efforts of the operator to the exclusion of the power actuator or in connection with and serving to supplement the power of the actuator.

While we have shown the piston of the suction actuated device connected with brake mechanism of the vehicle, it is obvious that it may be connected instead to a door or doors of a vehicle, as an auto bus for example, for opening the same, the door or doors being returned to closed or normal position by a retracting spring.

Figure 6:
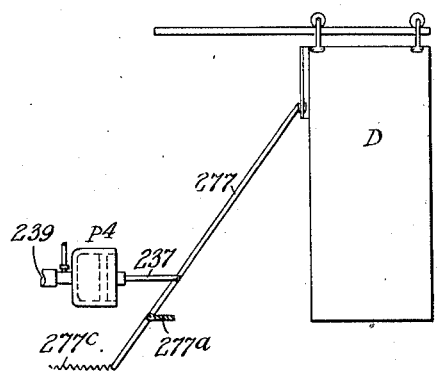
Fig. 6 is a detail view showing one of the actuators operatively connected with a door of the vehicle.

In Fig. 6 we have shown for example an actuator indicated at P⁴ having its piston rod 237 connected to an operating lever 277 pivotally mounted on a stationary part of the vehicle indicated at 277ª, one end of said lever having a sliding connection with a sliding door D of the vehicle and said lever being provided with a retracting spring 277ᶜ for returning the door to closed position and the actuator piston to off or released position.

What we claim and desire to secure by Letters Patent is:—

1. In brake mechanism for automotive vehicles, the combination with an internal combustion engine having a suction passage provided with an air inlet for supplying the air for the explosive mixture, a carburetor for fuelizing said air provided with a closed liquid fuel chamber, means for normally maintaining a predetermined liquid level therein, and a jet nozzle discharging within said suction passage and a throttle valve for said suction passage interposed between said jet nozzle and the engine cylinders, of a suction actuated device comprising a cylinder and piston, connections from said piston to brake mechanism, a normally open brake valve interposed between said air inlet and said jet nozzle for controlling said air inlet of the suction passage, a tubular connection from the cylinder of the suction actuated device to the suction passage between said brake valve and the carburetor jet nozzle, and a continuously open equalizing passage connecting the float chamber above the liquid level therein with the suction passage of the engine between the said brake valve and the jet nozzle of the carburetor.

2. In brake mechanism for automotive vehicles, the combination with an internal combustion engine having a suction passage provided with an air inlet for supplying the air for the explosive mixture, a carburetor for fuelizing said air provided with a closed liquid fuel chamber, means for normally maintaining a predetermined liquid level therein, and a jet nozzle discharging within the suction passage, and a throttle valve for said suction passage interposed between said jet nozzle and the engine cylinders, of a suction actuated device comprising a cylinder and piston, connections from said piston to brake mechanism, a normally open brake valve interposed between said air inlet and said jet nozzle for controlling said air inlet of the suction passage, a tubular connection from the cylinder of the suction actuated device to the suction passage between said brake valve and the carburetor nozzle, and a continuously open equalizing passage connecting the float chamber above the liquid level therein with said tubular suction connection from the suction actuated device, and thereby with the suction passage between the brake valve and the jet nozzle of the carburetor.

3. In brake mechanism for automotive vehicles, the combination with an internal combustion engine having a suction passage provided with an air inlet for supplying the air for the explosive mixture, a carburetor for fuelizing said air provided with a closed liquid fuel chamber, an approximately constant pressure liquid fuel supply therefor, and means including a float and float operated valve for normally maintaining a predetermined liquid level in said chamber, and a jet nozzle discharging into said suction passage, and a throttle valve for the suction passage interposed between the jet nozzle and the engine cylinders, of a suction actuated device comprising a cylinder and piston, connections from said piston to brake mechanism, a normally open brake valve interposed between said air inlet and said jet nozzle for controlling said air inlet, a tubular connection from the cylinder of the suction actuated device to said suction passage between said brake valve and the jet nozzle of the carburetor, a continuously open equalizing passage connecting the float chamber above the liquid level therein with the suction passage between said brake valve and the jet nozzle of the carburetor, and compensating means responsive to variations in pressure upon the surface of the liquid in said float chamber, for increasing the pressure on the float valve in a direction to seat the same.

4. In brake mechanism for automotive vehicles, the combination with an internal combustion engine having a suction passage provided with an air inlet for supplying the air for the explosive mixture, a carburetor for fuelizing said air provided with a closed liquid fuel chamber, an approximately constant pressure liquid fuel supply therefor, and means including a float and float operated valve for normally maintaining a predetermined liquid level in said chamber, and a jet nozzle discharging into said suction passage, and a throttle valve for the suction passage interposed between the jet nozzle and the engine cylinders, of a suction actuated device comprising a cylinder and piston, connections from said piston to brake mechanism, a normally open brake valve interposed between said air inlet and said jet nozzle for controlling said air inlet, a tubular connection from the cylinder of the suction actuated device to said suction passage between said brake valve and the jet nozzle of the carburetor, a continuously open equalizing passage connecting the float chamber above the liquid level therein with the suction passage between said brake valve and the jet nozzle of the carburetor, and automatic compensating means including a movable part having opposite surfaces exposed respectively to the atmosphere and to the interior of the float chamber above the liquid level therein, and operatively connected with the float valve.

5. In brake mechanism for automotive vehicles, the combination with an internal combustion engine having a suction passage provided with an air inlet for supplying the air for the explosive mixture, a carburetor for fuelizing said air provided with a closed liquid fuel chamber, an approximately constant pressure liquid fuel supply therefor, and means including a float and float operated valve for normally maintaining a predetermined liquid level in said chamber, and a jet nozzle discharging into said suction passage, and a throttle valve for the suction passage interposed between the jet nozzle and the engine cylinders, of a suction actuated device comprising a cylinder and piston, connections from said piston to brake mechanism, a normally open brake valve interposed between said air inlet and said jet nozzle for controlling said air inlet, a tubular connection from the cylinder of the suction actuated device to said suction passage between said brake valve and the jet nozzle of the carburetor, a continuously open equalizing passage connecting the float chamber above the liquid level therein with the suction passage between said brake valve and the jet nozzle of the carburetor, and automatic compensating means including a movable part having opposite surfaces exposed respectively to the atmosphere and to the interior of the float chamber above the liquid level therein, and a spring interposed between said movable part and the float operated valve.

6. In brake mechanism for automotive vehicles, the combination with an internal combustion engine having a suction passage provided with an air inlet for supplying the air for the explosive mixture, a carburetor for fuelizing said air provided with a closed liquid fuel chamber, and approximately constant pressure liquid fuel supply therefor, and means including a float and float operated valve for normally maintaining a predetermined liquid level in said chamber, and a jet nozzle discharging into said suction passage, and a throttle valve for the suction passage interposed between the jet nozzle and the engine cylinders, of a suction actuated device comprising a cylinder and piston, connections from said piston to brake mechanism, a normally open brake valve interposed between said air inlet and said jet nozzle for controlling said air inlet, a tubular connection from the cylinder of the suction actuated device to said suction passage between said brake valve and the jet nozzle of the carburetor, a continuously open equalizing passage connecting the float chamber above the liquid level therein with the suction passage between said brake valve and the jet nozzle of the carburetor, and automatic compensating means including a movable part having opposite surfaces exposed respectively to the atmosphere and to the interior of the float chamber above the liquid level therein, and a spring interposed between said movable part and the float operated valve, and an adjusting device engaging said movable part for regulating the tension of said spring.

7. In brake mechanism for automotive vehicles, the combination with an internal combustion engine having a suction passage provided with an air inlet for supplying the air for the explosive mixture, a carburetor for fuelizing said air provided with a closed liquid fuel chamber, an approximately constant pressure liquid fuel supply therefor, and means including a float and float operated valve for normally maintaining a predetermined liquid level in said chamber, and a jet nozzle discharging into said suction passage, and a throttle valve for the suction passage interposed betwen the jet nozzle and the engine cylinders, of a suction actuated device comprising a cylinder and piston, connections from said piston to brake mechanism, a normally open brake valve interposed between said air inlet and said jet nozzle for controlling said air inlet, a tubular connection from the cylinder of the suction actuated device to said suction passage between said brake valve and the jet nozzle of the carburetor, a continuously open equalizing passage connecting the float chamber above the liquid level therein with the suction passage between said brake valve and the jet nozzle of the carburetor, an automatic compensating means comprising a flexible diaphragm having one face exposed to the atmosphere, and the opposite face exposed to the interior of the float chamber above the liquid level therein, and means for connecting said diaphragm with the float operated valve for increasing the pressure on said valve in a direction to seat it when the pressure within the float chamber is less than atmospheric pressure.

8. In brake mechanism for automotive vehicles, the combination with an internal combustion engine having a suction passage provided with an air inlet for supplying the air for the explosive mixture, a carburetor for fuelizing said air providing with a closed liquid fuel chamber, an approximately constant pressure liquid fuel supply therefor, and means including a float and float operated valve for normally maintaining a predetermined liquid level in said chamber, and a jet nozzle discharging into said suction passage, and a throttle valve for the suction passage interposed between the jet nozzle and the engine cylinders, of a suction actuated device comprising a cylinder and piston, connections from said piston to brake mechanism, a normally open brake valve interposed between said air inlet and said jet nozzle for controlling said air inlet, a tubular connection from the cylinder of the suction actuated device to said suction passage between said brake valve and the jet nozzle of the carburetor, a continuously open equalizing passage connecting the float chamber above the liquid level therein with the suction passage between said brake valve and the jet nozzle of the carburetor, said float chamber being provided above the liquid level therein with an aperture communicating with the atmosphere, a flexible diaphragm closing said aperture, a spring interposed between said diaphragm and the float operated valve, and adjustable means for limiting the movement of said diaphragm in a direction to increase the tension of said spring.

9. In brake mechanism for automotive vehicles, the combination with an internal combustion engine having a suction passage provided with an air inlet for supplying the air for the explosive mixture, a carburetor for fuelizing said air provided with a closed liquid fuel chamber, means for normally maintaining a predetermined liquid level therein, and a jet nozzle discharging within the suction passage, and a throttle valve for said suction passage interposed between said jet nozzle and the engine cylinders, of a suction actuated device comprising a cylinder and piston, connections from said piston to brake mechanism, a normally open brake valve interposed between said air inlet and said jet nozzle for controlling said air inlet of the suction passage, a tubular connection from the cylinder of the suction actuated device to the suction passage between said brake valve and the carburetor jet nozzle, and an equalizing passage connecting the float chamber above the liquid level therein with the suction passage of the engine, an operator operated part, and connections therefrom to said brake valve, for closing said valve to effect the operation of the suction actuated device and the application of the brake mechanism connected with the piston thereof.

10. In brake mechanism for automotive vehicles, the combination with an internal combustion engine having a suction passage provided with an air inlet for supplying the air for the explosive mixture, a carburetor for fuelizing said air provided with a closed liquid fuel chamber, means for normally maintaining a predetermined liquid level therein, and a jet nozzle discharging within the suction passage, and a throttle valve for said suction passage interposed between said jet nozzle and the engine cylinders, of a suction actuated device comprising a cylinder and piston, connections from said piston to brake mechanism, a normally open brake valve interposed between said air inlet and said jet nozzle for controlling said air inlet of the suction passage, a tubular connection from the cylinder of the suction actuated device to the suction passage between said brake valve and the carburetor jet nozzle, and an equalizing passage connecting the float chamber above the liquid level therein with the suction passage of the engine, an operator operated part, and connections therefrom to said brake valve and to the throttle valve for effecting the movement of the brake valve in a direction to close it, and a movement of the throttle valve to open it after the closing of the brake valve.

11. In brake mechanism for automotive vehicles, the combination with an internal combustion engine having a suction passage provided with an air inlet for supplying the air for the explosive mixture, a carburetor for fuelizing said air provided with a closed liquid fuel chamber, means for normally maintaining a predetermined liquid level therein, and a jet nozzle discharging within the suction passage, and a throttle valve for said suction passage interposed between said jet nozzle and the engine cylinders, of a suction actuated device comprising a cylinder and piston, connections from said piston to brake mechanism, a normally open brake valve interposed between said air inlet and said jet nozzle for controlling said air inlet of the suction passage, a tubular connection from the cylinder of the suction actuated device to the suction passage between said brake valve and the carburetor jet nozzle, and an equalizing passage connecting the float chamber above the liquid level therein with the suction passage of the engine, yielding means for holding the throttle valve normally closed, yielding means providing a lesser resistance for normally holding the brake valve in open position, an operator operated part, and connections therefrom to the throttle valve and to the brake valve including equalizing means, whereby the movement of said operator operated part will effect the closing of the brake valve without operating the throttle valve, and the opening of the throttle valve after the brake valve is closed to a predetermined extent.

12. In brake mechanism for automotive vehicles, the combination with an internal combustion engine having a suction passage provided with an air inlet for supplying the air for the explosive mixture, a carburetor for fuelizing said air provided with a closed liquid fuel chamber, means for normally maintaining a predetermined liquid level therein, and a jet nozzle discharging within the suction passage, and a throttle valve for said suction passage interposed between said jet nozzle and the engine cylinders, of a suction actuated device comprising a cylinder and piston, connections from said piston to brake mechanism, a normally open brake valve interposed between said air inlet and said jet nozzle for controlling said air inlet of the suction passage, a tubular connection from the cylinder of the suction actuated device to the suction passage between said brake valve and the carburetor jet nozzle, and an equalizing passage connecting the float chamber above the liquid level therein with the suction passage of the engine, yielding means for holding the throttle valve normally closed, yielding means providing a lesser resistance for normally holding the brake valve in open position, an operator operated part, and connections therefrom to the throttle valve and to the brake valve including equalizing means, whereby the movement of said operator operated part will effect the closing of the brake valve without operating the throttle valve, and the opening of the throttle valve after the brake valve is closed to a predetermined extent, and means for detachably securing said brake valve in open position, whereby said operator operated part may be operated to effect the opening movement of the throttle valve without operating the brake valve.

13. In brake mechanism for automotive vehicles, the combination with an internal combustion engine having a suction passage provided with an air inlet for supplying the air for the explosive mixture, a carburetor for fuelizing said air provided with a closed liquid fuel chamber, means for normally maintaining a predetermined liquid level therein, and a jet nozzle discharging within the suction passage, and a throttle valve for said suction passage interposed between said jet nozzle and the engine cylinders, of a suction actuated device comprising a cylinder and piston, connections from said piston to brake mechanism, a normally open brake valve interposed between said air inlet and said jet nozzle for controlling said air inlet of the suction passage, a tubular connection from the cylinder of the suction actuated device to the suction passage between said brake valve and the carburetor jet nozzle, and an equalizing passage connecting the float chamber above the liquid level therein with the suction passage of the engine, yielding means for holding the throttle valve normally closed, yielding means providing a lesser resistance for normally holding the brake valve in open position, an operator operated part, and connections therefrom to the throttle valve and to the brake valve including equalizing means, whereby the movement of said operator operated part will effect the closing of the brake valve without operating the throttle valve, and the opening of the throttle valve after the brake valve is closed to a predetermined extent, an auxiliary operator operated part connected with the brake valve by a normally slack connection, and means for detachably locking said auxiliary operator operated part in position to hold the brake valve in open position, whereby the first mentioned operator operated part may be operated to effect the opening of the throttle valve without operating the brake valve.

14. In brake mechanism for automotive vehicles, the combination with a tractor vehicle provided with an internal combustion engine for propelling the same, having a suction passage, an air inlet therefor, a throttle valve, a carburetor having a closed float chamber, an approximately constant pressure liquid fuel supply therefor, a jet nozzle discharging into the suction passage, an equalizing passage connecting the float chamber above the liquid level therein with the suction passage of the engine, brake mechanism for the main vehicle, operating means therefor including an operator operated part, a trailer vehicle adapted to be connected with and propelled by the tractor vehicle, brake mechanism for the trailer, a suction actuated device on the trailer comprising a cylinder and a piston therein connected with the trailer brake mechanism, a normally open brake valve interposed between said air inlet of the suction passage and said jet nozzle for controlling said air inlet, a tubular connection from said cylinder to said suction passage between the brake valve and the jet nozzle of the carburetor, and an operator operated part on the tractor vehicle operatively connected with the brake valve for moving the same to closed position.

15. In brake mechanism for automotive vehicles, the combination with a tractor vehicle provided with an internal combustion engine for propelling the same, having a suction passage, an air inlet therefor, a throttle valve, a carburetor having a closed float chamber, an approximately constant pressure liquid fuel supply therefor, a jet nozzle discharging into the suction passage, an equalizing passage connecting the float chamber above the liquid level therein with the suction passage of the engine, brake mechanism for the main vehicle, operating means therefor including an operator operated part, a trailer vehicle adapted to be connected with and propelled by the tractor vehicle, brake mechanism for the trailer, a suction actuated device on the trailer comprising a cylinder and a piston therein connected with the trailer brake mechanism, a normally open brake valve interposed between said air inlet of the suction passage and said jet nozzle for controlling said air inlet, a tubular connection from said cylinder to said suction passage between the brake valve and the jet nozzle of the carburetor, and an operator operated part on the tractor vehicle operatively connected with the brake valve for moving the same to closed position, and connected with the throttle valve for opening the throttle valve after the brake valve is fully closed, to expedite the evacuation of the cylinder of the suction actuated device and the application of the trailer brakes.

16. In brake mechanism for automotive vehicles, the combination with a tractor vehicle provided with an internal combustion engine for propelling the same, having a suction passage, an air inlet therefor, and a throttle valve, a carburetor having a closed float chamber, an approximately constant pressure liquid fuel supply therefor, a jet nozzle discharging into the suction passage, an equalizing passage connecting the float chamber above the liquid level therein with the suction passage of the engine, brake mechanism for the main vehicle, operating means therefor including an operator operated part, a trailer vehicle adapted to be connected with and propelled by the tractor vehicle, brake mechanism for the trailer, a suction actuated device on the trailer comprising a cylinder and a piston therein connected with the trailer brake mechanism, a normally open brake valve interposed between said air inlet of the suction passage and said jet nozzle for controlling said air inlet, a tubular connection from said cylinder to said suction passage between the brake valve and the jet nozzle of the carburetor, and an operator operated part on the tractor vehicle operatively connected with the brake valve for moving the same to closed position, and connected with the throttle valve for opening the throttle valve after the brake valve is fully closed, to expedite the evacuation of the cylinder of the suction actuated device and the application of the trailer brakes, and means for locking the brake valve in open position.

17. In an automotive vehicle, the combination with an internal combustion engine having a suction passage provided with an air inlet for supplying the air for the explosive mixture, a carburetor for fuelizing said air provided with a closed liquid fuel chamber, means for normally maintaining a predetermined liquid level therein, and a jet nozzle discharging within said suction passage, and a throttle valve for said suction passage interposed between said jet nozzle and the engine cylinders, of a suction actuated device comprising a cylinder and piston, connections from said piston to a part to be operated, a normally open air inlet valve interposed between said air inlet and said jet nozzle for controlling said air inlet of the suction passage, a tubular connection from the cylinder of the suction actuated device to the suction passage between said air inlet valve and the carburetor jet nozzle, and a continuously open equalizing passage connecting the float chamber above the liquid level therein with the suction passage of the engine between said air inlet valve and the jet nozzle of the carburetor.

18. The combination with a suction passage of an internal combustion engine, a throttle valve for controlling the explosive mixture therethrough, and an accelerator pedal for operating the throttle valve, of a suction actuated device having a constantly open connection with said suction passage, a brake valve in the suction passage, means acting to operate the brake and throttle valves to close the former and open the latter successively, and means to lock the brake valve in open position, whereby the throttle valve may be operated independently of said pedal.

19. In a brake mechanism for automotive vehicles, in combination, a tractor vehicle provided with an internal combustion engine for propelling the same, having a suction passage, an air inlet therefor, a carburetor jet nozzle, and throttle and brake valves located in said passage on opposite sides of said nozzle, of a trailer vehicle adapted to be connected with and propelled by the tractor vehicle, brake mechanism on each of said vehicles, a suction actuated brake operating device on the trailer and a connection therefrom to said suction passage between said valves, and means on the tractor vehicle for controlling the brake and throttle valves in succession, together with means on the tractor vehicle for operating the brake mechanism thereof independently of the brake mechanism of the trailer.

In testimony whereof we affix our signatures.

CALEB S. BRAGG.
VICTOR W. KLIESRATH.